United States Patent [19]

Thompson

[11] 4,109,522

[45] Aug. 29, 1978

[54] METHOD OF BOREHOLE LOGGING USING PASSIVE JOSEPHSON CURRENT DETECTOR TO DIRECTLY DETERMINE THE PRESENCE OF HYDROCARBONS

[75] Inventor: Don D. Thompson, Corona Del Mar, Calif.

[73] Assignee: Chevron Research Company, San Francisco, Calif.

[21] Appl. No.: 738,990

[22] Filed: Nov. 4, 1976

Related U.S. Application Data

[63] Continuation-in-part of Ser. No. 526,441, Nov. 22, 1974, abandoned, which is a continuation of Ser. No. 241,504, Apr. 6, 1972, abandoned.

[51] Int. Cl.² .................................................. E21B 49/00
[52] U.S. Cl. ...................................... 73/154; 250/261; 250/338
[58] Field of Search .................. 73/152, 154; 250/338, 250/253, 261, 262; 357/5, 26; 307/306, 310

[56] References Cited

U.S. PATENT DOCUMENTS

| | | | |
|---|---|---|---|
| 2,972,251 | 2/1961 | Harper | 73/154 |
| 3,363,457 | 1/1968 | Ruehle et al. | 73/154 |
| 3,423,607 | 1/1969 | Kunzler | 357/5 |

OTHER PUBLICATIONS

Matisoo, "Josephson-Type Superconducting Tunnel Junction and Applications," IEEE Trans. on Magnetics, 12/79, pp. 848, 868, 869.

*Primary Examiner*—Herbert Goldstein
*Attorney, Agent, or Firm*—R. L. Freeland, Jr.; H. D. Messner

[57] ABSTRACT

A high-gain Josephson-type two-particle tunneling detector is positioned in a borehole penetrating an earth formation and tuned for response in a frequency range of 8400 to 9600 gigahertz. Result: IR emission due to "stretching" vibration of the C-H bonds of adjacently situated hydrocarbons can be detected in surprising fashion.

23 Claims, 7 Drawing Figures

METHOD OF BOREHOLE LOGGING USING PASSIVE JOSEPHSON CURRENT DETECTOR TO DIRECTLY DETERMINE THE PRESENCE OF HYDROCARBONS

CROSS-REFERENCE TO RELATED APPLICATIONS

This application is a continuation-in-part of application Ser. No. 526,441, filed Nov. 22, 1974, for "Method of Borehole Logging Using Passive Josephson Current Detector to Directly Determine the Presence of Hydrocarbons," now abandoned which, in turn is a continuation of Ser. No. 241,504, filed Apr. 6, 1972, now abandoned, the disclosures of which are incorporated herein by reference.

FIELD OF THE INVENTION

This invention relates to borehole logging equipment and, more particularly, to a down-hole superconducting detector manifesting Josephson two-particle tunneling effects such as are described or analogous to those set forth in "Physics Letters," Vol. 1, page 251 (July 1962) and subsequent related papers. A Josephson two-particle tunneling device usually comprises two superconducting bodies separated by a thin nonsuperconducting barrier defining a current path therebetween. In the generating mode, radio frequency currents of at least one gigacycle per second can be obtained.

BACKGROUND OF THE INVENTION

Intensities of emitted energies of hydrocarbons within earth formations are extremely low. Of course, the borehole logging equipment art has proposed use of semiconductor detectors for determining radiation levels of materials in and around a borehole associated with hydrocarbons. In U.S. Pat. No. 3,496,360, e.g., a semiconductor device for detecting nuclear radiation such as gamma rays is described in detail; but the purity of the desired spectrum can be subject to degradation from elements other than that being monitored. Consequently, the energy-resolving capabilities of the usual semiconductor devices have been found, in many cases, to be so low that desired characteristics associated with hydrocarbons cannot be resolved in the presence of usual background conditions. Detection of infrared radiation directly from hydrocarbons is more complex than detection of nuclear radiation. Reasons: water and other earth formation materials represent a serious background condition; hence infrared-radiation-resolving-capabilities of semiconductor devices are, in instances of which I am aware, extremely imprecise, especially where the infrared radiation being monitored is occurring because of differences in energy levels due to passive changes in thermal equilibrium within the formation.

Researchers hence heretofore have concentrated on obtaining a "generalized" knowledge of heat flow in a formation, preferably using an IR device located in a newly drilled borehole. In that way, passive emission measurements of IR energy can be obtained before heat equilibrium within the formation becomes established; see, e.g., U.S. Pat. No. 3,363,457 for "Methods of Measurement of Radiant Energy from Subsurface Formations," Ruehle et al.

SUMMARY OF THE INVENTION

It has now been discovered that naturally occurring infrared radiation from petroleum reservoirs within an earth formation penetrated by a borehole, irrespective of its "age," can be detected and distinguished from radiation occurring from other formation elements using a passively operated high-gain Josephson-type two-particle tunneling detector located within a logging sonde movable within the borehole, such detector being tuned for response over a surprisingly narrow frequency range of 8400 to 9600 gigahertz. Operating temperature range of superconducting materials of the Josephson type: Maximum — $0.5°$ K to about $25°$ K ($-272.5°$ C to $-248°$ C); preferred range — about $1°$ K to $16°$ K ($-272°$ C to $-257°$ C).

The present invention contemplates usage of the unique response and sensitivity characteristics of a high-gain Josephson detector in the above frequency response range of interest to monitor bonds of infrared radiation which serve as signature characteristics of petroleum materials in situ within an earth formation. Such signatures relate primarily, it is believed, to stretching vibration of the C-H bonds of the in situ hydrocarbons. The Josephson detector can be operated by means of up-hole and down-hole control circuitry so as to scan a series of previously chosen frequencies in the far infrared range, say within the aforementioned range of 8400 to 9600 gigahertz; but a range of 8400 to 9000 gigahertz is preferred for reasons set forth below.

For operation, the logging sonde of the present invention is equipped with a liquefied gas-filled cryostat within which the Josephson detector is immersed. A thermal electric cooling module is also provided to absorb heat from the cryostat and detector. The module discharges the heat through the housing of the sonde into the borehole environment. The detector, cryostat, and thermal electric module are capable of being rotated in azimuth. This can provide desired directionality information as to the location — in azimuth — of the source of the detected infrared radiation. In that way, hydrocarbons can be mapped as to azimuth as well as to depth relative to the borehole in which the logging sonde is situated. But the response of the Josephson-type tunneling device within the borehole remains for maximum operation at a response frequency of between 8400 to 9600 gigahertz. Reason for the above response range: stretching vibration of the C-H bonds of the hydrocarbon has been found to be surprisingly dominant in the IR emission phenonomen. Accordingly, IR emission in the above-selected range can be directly utilized in the Josephson device to indicate the presence of such hydrocarbons.

OBJECT OF THE INVENTION

The object of the invention is the provision of a novel Josephson-type two-particle tunneling detector and method associated therewith for direct detection of hydrocarbons from within a borehole penetrating an earth formation.

DESCRIPTION OF THE DRAWINGS

Further objects and features of the invention become readily apparent to those skilled in the art from the specification and appended drawings illustrating its preferred embodiments, wherein.

PARTICULAR EMBODIMENTS OF THE INVENTION

Figures 1, 3:
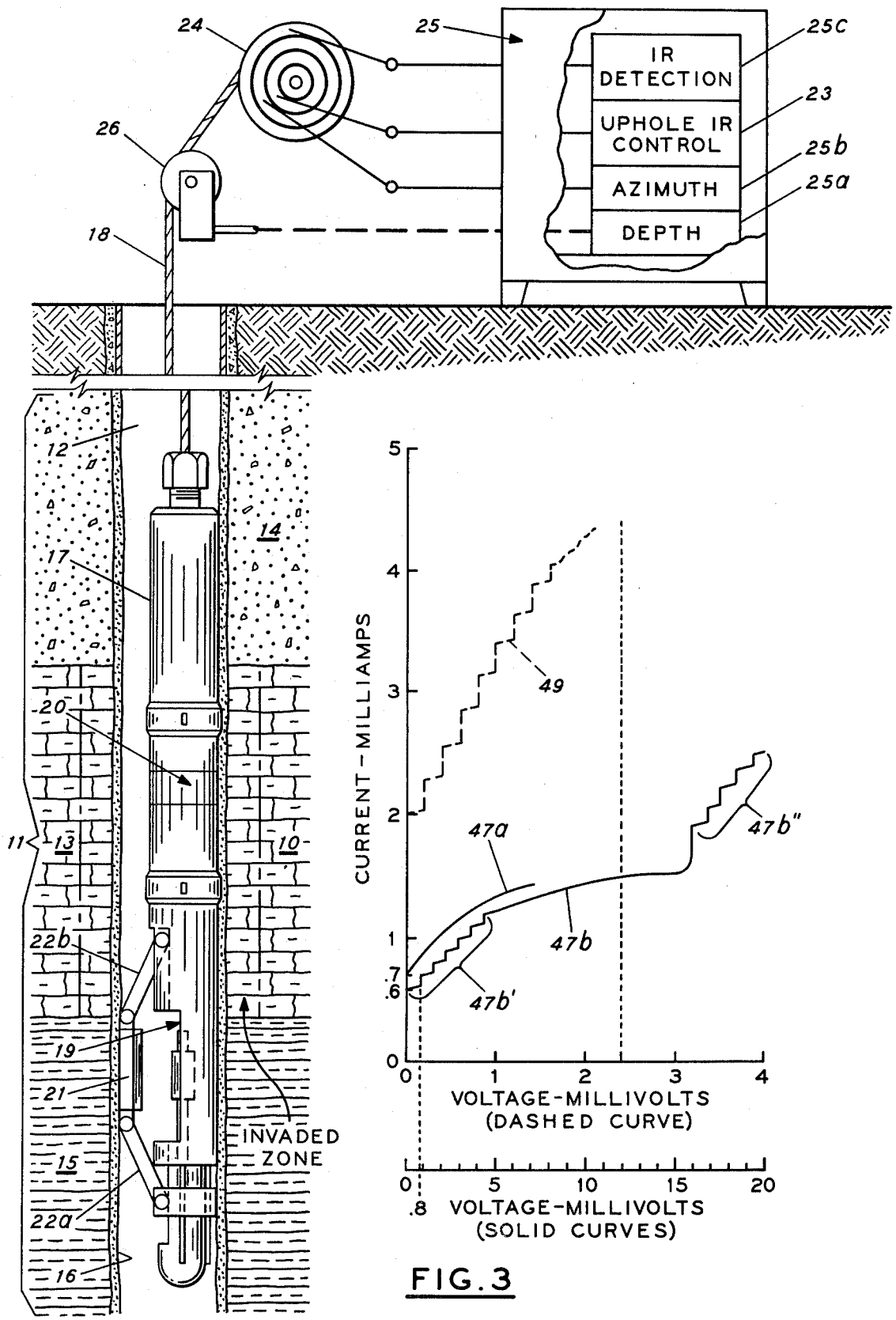
FIG. 1 is a sectional view illustrating a borehole penetrating an earth formation illustrating the position of a logging sonde incorporating a passive Josephson-type detector circuit useful in identifying — at depth and azimuth — reservoirs within the earth formation.
FIGS. 3, 4 and 4a are operational diagrams of the Josephson detector of FIGS. 1 and 2, illustrating its performance in terms of current and voltage.

Reference is now made to the drawings. In particular, FIG. 1 illustrates use of the method of the present invention to locate a petroleum reservoir, such as an oil reservoir indicated at 10 in an earth formation 11. For purposes of explanation, assume that the reservoir 10 is an oil reservoir lying parallel to the sidewall of wellbore 12. It, of course, may be displaced from the borehole by a considerable distance as within sedimentary bed 13, the incremental distance rendering detection difficult. Bed 13 is seen to lie between more impermeable beds 14 and 15, and can be a pervious oil-bearing formation such as limestone laid down horizontally between the more impervious sedimentary beds 14 and 15. The oil in place within the formation bed 13 is believed to accumulate by gravity separation from other formation fluids.

During drilling of the wellbore 13, drilling fluid controls the hydrostatic fluids contained in the earth formation 11. Under usual drilling conditions, the drilling fluid pressure is always greater in the wellbore 12 than in the formation 11. Accordingly, a filter cake 16 is normally formed along the sidewall of the wellbore during drilling, as liquid of the drilling fluid seeps into the adjacent formation and deposits residue and solid matter on the borehole wall. If the oil-bearing bed 13, however, is relatively impermeable, say limestone of few millidarcies and a porosity of less than 5 to 10%, the filtrate, paradoxically, more readily penetrates the available pore space and can readily "plug" the earth formation behind it. Obviously, if the reservoir 10 behind the invaded zone can be identified and its vertical extent mapped as a function of depth, channels can be opened through the invaded zone (by slabbing, acidizing, fracturing and perforating) with enough accuracy to penetrate the oil reservoir and develop its contents. It has also been found that the depth of penetration of a filtrate is greater in oil-bearing beds such as the sedimentary bed 13 of FIG. 1 than in more impervious formations above and below such as in beds 14 and 15. Where the formation being mapped by means of logging sonde 17 is not previously determined to have oil-bearing potential, the occurrence of infrared radiation in selected frequency bands received at the Josephson detector circuit generally indicated at 20 within sonde 17 can be utilized to indicate the presence of oil-bearing rock formations such as the oil reservoir. Furthermore, even if the oil reservoir is situated too far from the borehole to be directly detected, the stratigraphy of the earth formation may still be mapped. In this aspect of the method, a condition normally present in a borehole is used, namely: the radiation intensity in impervious structures (due to filtrate invasion) will be much less than that in the relatively impermeable formation. Accordingly, after a borehole is mapped, the bedding interfaces marking vertical boundaries of the bed 13 can be indicated.

In some mapping applications, the location of oil reservoir 10 may vary in azimuth at a given mapping depth. It is believed that small segments of the more impervious formations such as shale stringers somehow intrude into the oil-bearing beds adjacent to the wellbore. These stringers are more impervious to water invasion than the rest of the bed. Obviously, if the location of a radiation source could be averaged in azimuth at each mapping depth, the results could be useful in more effectively locating oil reservoirs within the adjacent earth formation.

To identify the presence of oil reservoir 10 behind an invaded zone of sedimentary bed 13 as a function of depth and azimuth, logging sonde 17 is seen in FIG. 1 to be supported by cable 18 within the borehole 12 filled with an oil-base drilling fluid and includes Josephson-type IR detecting circuit 20 positioned adjacent to an oil reservoir 10. As indicated, circuit 20 is mounted in the lower end of sonde 17 whose housing (as explained below) is suitably constructed using materials which do not inhibit system operations. In order to enhance measurements, sonde 17 is also provided with means for urging the detecting circuit 20 against the side wall of the borehole 12, e.g., a bowed spring 21 is laterally movable from a depression 19 in the housing of the sonde 17. The spring 21 contacting the side wall of the borehole 12 then forces the entire sonde into contact with the diametrically opposed side wall of the borehole. As indicated, the bowed spring 21 connects at its ends to a series of pivotal arms 22a and 22b by suitable hinge means. Suitable actuation means (not shown) within the sonde is used to urge the arms 22a and 22b and spring 21 in the sonde 17 and, more importantly, Josephson detector circuit 20 in direct contact with the borehole wall during each logging operation.

Control of the Josephson circuit 20 is provided by control signals which pass from control circuitry 23 generally indicated within a control and display unit 25 at the surface of the earth, through a slip-ring assembly 24, thence downward through conductors within cable 18 to the Josephson circuit 20. During detection of IR, the signal direction is reversed: signals pass from the Josephson detector 20 up-hole through other conductors within the cable 18, through the slip-ring assembly 24 to control and display unit 25.

At the earth's surface, circuits for recording the IR signals in control and display unit 25 include three indicators: for depth, 25a; for azimuth, 25b; and IR indicator, 25c. Depth indicator 25a shows the depth the sonde was in the borehole. The mapping depth is measured by pulley 26; in turn, pulley 26 is connected to the depth indicator 25a. Azimuthal direction of the origin of the infrared radiation may be indicated by indicator 25b, connected downhole to a sensor within rotor 47 (FIG. 2) as explained below. The infrared detector 25c indicates the occurrence of IR radiation as a function of frequency as explained below. By physically associating the depth indicator, the azimuth indicator, and the IR indicator, information on all 3 units can be assimilated and recorded to indicate the presence of an oil reservoir within the formation at each mapping depth. Likewise, if the oil reservoir extends throughout a bed, the potential of the reservoir can be determined.

Before proceeding with a description of the present invention utilizing a Josephson detector, a brief description of its theoretical basis may be instructive. Various vibrational, bending and rotational transitions are generated by in-situ petroleum materials at nearly all thermally accessible ranges in the regions of spectra of interest. While energy leaving the surface of a warm crude oil is several times more intense than minimum sensitivity available in a Josephson detector of the present invention (minimum sensitivity of the Josephson detector equals about $10^{-13}$ watts; response time, $10^{-8}$ seconds), the energy received at the borehole depends upon the properties, mean distances and relative characteristics of molecules in the vicinity of the reservoir of interest. But experience has now indicated stretching vibration of the C-H bonds of the hydrocarbon molecule predominates the IR emission spectrum, if the detection is sensitive enough. Although infrared transitions are thermally accessible over the total region of response, certain intense areas exist which are directly relatable to some certain hydrocarbon oil deposits, particularly due to the stretching modes of C-H bonds of the hydrocarbon molecules, say in a range of 8400 to 9000 gigahertz; in order to obtain radiation from aromatic molecules, an upper limit of 9600 gigahertz may be desirable. Since the Josephson detector is highly monochromatic, infrared scanning in the far infrared region can be surprisingly easily accomplished while the logging sonde is located within the borehole. As scanning at discrete bands of interest occur, crude oil can be identified and recorded. With additional seismic information, it is also possible to deduce the presence of a gas reservoir using the reciprocal of signal response of the Josephson device: absence of signature signals in a region of expected response of the liquid hydrocarbons after the former has been defined. Gas reservoirs are usually found overlying crude oil deposits. By mapping the vertical extent of the latter, absence of signals from the region above the crude oil gives rise to the indication of a gas reservoir. Other relevant factors: geology of the entire formation.

Figure 4:
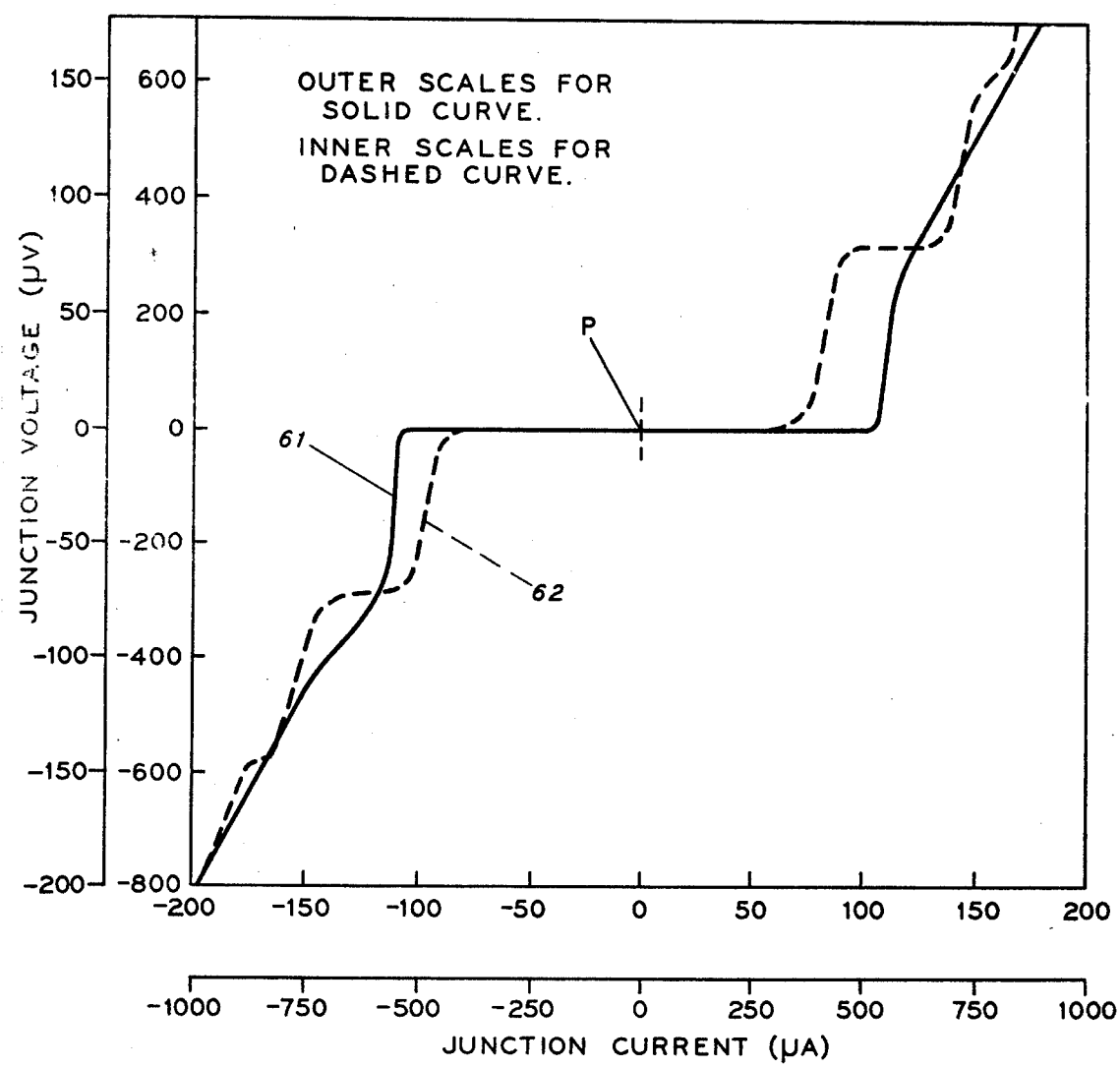

FIGS. 3 and 4 illustrate the principle of operation of the Josephson-type two-particle tunelling detector of the present invention. A Josephson-type device has crude current-voltage characteristics, as depicted in these Figures. The particular structure can utilize a variety of materials. For example, the superconducting materials can be niobium, lead, tantalum, and/or indium. Asymmetrically combined junctions can also be used in which combinations of these materials (e.g., tantalum and indium or niobium and tantalum) are fabricated. Also relevant is the fabrication characteristic of the device: either point-contact or body-to-body techniques can be used.

For the most part, point-contact junctions are preferred, since the low junction capacitance permits better coupling of the radiation at higher frequencies. The point-contact function is also more easily fabricated, and the I-V characteristics more readily adjusted, as pointed out in U.S. Pat. No. 3,423,607, for "Josephson Current Structure," J. E. Kunzler et al.

OPERATING CHARACTERISTICS

The Josephson effect refers to a remarkable property of current flow through a barrier between two superconductors: direct current can be driven through a Josephson structure without developing any voltage across that junction. The maximum amplitude of the zero-voltage current is a quasi-periodic function of applied magnetic and electric fields.

E.g., in the generating mode, when a DC voltage of V microvolts is maintained across the junction, the Josephson current is oscillatory with a frequency proportional to $2eV/h$, where $e$ is the magnitude of the electronic charge and $h$ is Planck's constant (483.6 megacycle per microvolt). And in the reciprocal detecting mode, a Josephson junction exposed to an electromagnetic field generates a voltage-current characteristic modified by the field. The alternating Josephson currents (called AC Josephson current) are frequency-modulated by the RF voltages driven by the applied radiation. Whenever one of the modulation sidebands occurs at zero frequency, a current step (at constant voltage) appears in the I-V characteristic diagram of the Josephson junction. Such occurs for voltages (V) such that the frequency of the AC Josephson current $f'$ is equal to a constant ($n$) times the frequency ($f$) of the applied radiation so that:

$$V = hf'/2e = nhf/2e$$

where the terms are as defined above. Amplitude of the current is a direct measure of the power level of the radiation, the amplitude of the current in the Nth Josephson step varying as the Bessel function of the order $n$, $J_n (2eV/hf)$.

As shown in FIG. 3, dashed curve 49 represents the current-voltage characteristic observed for a Josephson device operating in the generating mode and comprising a niobium-lead structure of the point-contact design. Note that the voltage has been varied across the structure to permit the diode to behave as a typical Josephson current generator. As shown, the zero-voltage current of curve 49 is about 2 milliamps. Increasing voltage up to a level of the order of 1.4 millivolts produces (along the dashed curve 49) the stepped structure characteristic of two-particle tunneling. It should be evident that the device illustrated (under the chosen pressure contact) functions in the manner of a bridge which, in effect, is like that for body-to-body contact devices in which the superconductors are interspaced between a dielectric barrier. Typically, the zero-voltage current of all such devices can be increased or decreased (aside from change in contact pressure), dependent upon conductivity of the superconducting materials as well as the interfacial area therebetween and, if used, the type of dielectric barrier. In FIG. 3 for the device shown, increasing voltage results in the pronounced Josephson effect at a substantially constant slope from 0 to about 1.4 millivolts. The combined energy gap value — a voltage of 2.4 millivolts — is indicated by phantom line. This value is determined based upon the total energy gap for the two concerned semiconductors. (For example, niobium has a value of 1.4 millivolts, while lead has a value of 1 millivolt). Dashed curve 49 is, of course, indicative of the use of Josephson structures as oscillators as described elsewhere; for example, see "Physics Letters," Vol. 1, page 251 (1962). As is there described, the frequency of oscillation of any point on the I-V characteristic curve 49 which shows the RF Josephson current effect (that is, from 0 to about 1.4 millivolts) may be determined from the previously mentioned relationship: $f=2eV/h$ where $v$ is voltage in millivolts and $2e/h$ equals the electronic charge divided by Planck's constant, as previously defined. Again, the frequency of the Josephson RF oscillation increases with voltage.

Curves 47a and 47b of FIG. 3 are plots showing the current-voltage characteristics of the same type of Josephson device, but in which the device is operated as an infrared radiation detector. For this type of operation, care just be taken that structure does not introduce distinct resonant mode. As shown, with no applied DC bias, the device has a finite zero-voltage current (sometimes called the critical supercurrent) of the order of about 1 millampere. With increasing voltage, there is a corresponding increase in current along the curve 47a, but the Josephson effects are, if present at all, not evident on the scale to which the curve is plotted. In order to operate as a detector, the Josephson diode is biased so as to operate in the manner depicted by curve 47b of FIG. 3. Note that the zero-voltage current of about 0.6 milliamperes, a current just below the supercurrent, is caused to flow. Application of an infrared RF field results in the reduction of the critical supercurrent. Under these circumstances, the Josephson diode follows the characteristic represented by the positions of curve 47b, marked as 47b', and a finite voltage is measured across the junction. Illustratively, if the device is current-biased to a value of 0.7 milliamperes, a voltage of the magnitude of 0.8 millivolts results. Further increase in DC voltage results in the device following the remaining portion of curve 47b with successive steps representing succeeding modes corresponding to harmonic frequencies. Calculation of the fundamental frequency of the applied IR radiation is by applying the relationships set forth hereinbefore. Succeeding modes representing harmonic frequencies can be calculated using the same equation.

It should be pointed out that conditions depicted in the I-V characteristic curve 47b can be such that, in effect, there is a breakdown of the dielectric nonsuperconducting layer (or barrier) between the superconducting members. Such a quasi-dielectric layer breaks down and results in the familiar break at a voltage corresponding to the sum of the gap energies of the supercurrent members. (The quasi-nature of the breakdown is based on the fact that a point-contact device is depicted in FIG. 3; body-to-body devices more readily illustrate the phenomenon). Above the break, the structure again reflects the applied IR radiation in the manner which has been described by Dayem and Martin (see "Physics Review Letters," Vol. 8, page 246 (1962).

FIG. 4 depicts I-V characteristic curves 61 and 62 for niobium-niobium and indium-indium contact-point junctions at 4.2° K and 1.3° K, respectively. Solid curve 61 illustrates the establishment of a zero current at zero voltage at a selected contact pressure and also shows the curve 61 is symmetrical about the zero-zero intersection point (P). Operation of the Josephson device as contemplated in the present invention could be in any one of the modes depicted in curves of FIG. 3 or in the manner of FIG. 4. Characteristics depicted in FIG. 4 differ from the behavior of the junction of FIG. 3; in FIG. 3, zero-voltage current can only be reduced to zero at certain RF field values (assuming an initially low zero voltage current of, say, 0.2–0.5 milliamperes or less). However, in FIG. 4, changes in contact pressure can be used to vary the zero-voltage, zero-current intersection point (P), if desired. Note also that when voltage appears across the junction, curve 61 increases smoothly and continuously (which is not always true of thin-film, body-to-body junctions).

AC Josephson effects are produced by applying monochromatic radiation to the junction, which results in the generation of dashed curves 61 and 62. Curve 62 represents the effect of monochromatic radiation of $10^{-9}$ watts at about 150 gigahertz incident upon the In-In junction at 1.3° K. Note in curve 62 that frequencies beyond one-half of the indium superconducting gap, constant-voltage steps are present. These steps (at such low power levels) indicate that high sensitivity of the Josephson device even without optimizing coupling of the junction to the RF field.

Figure 2:
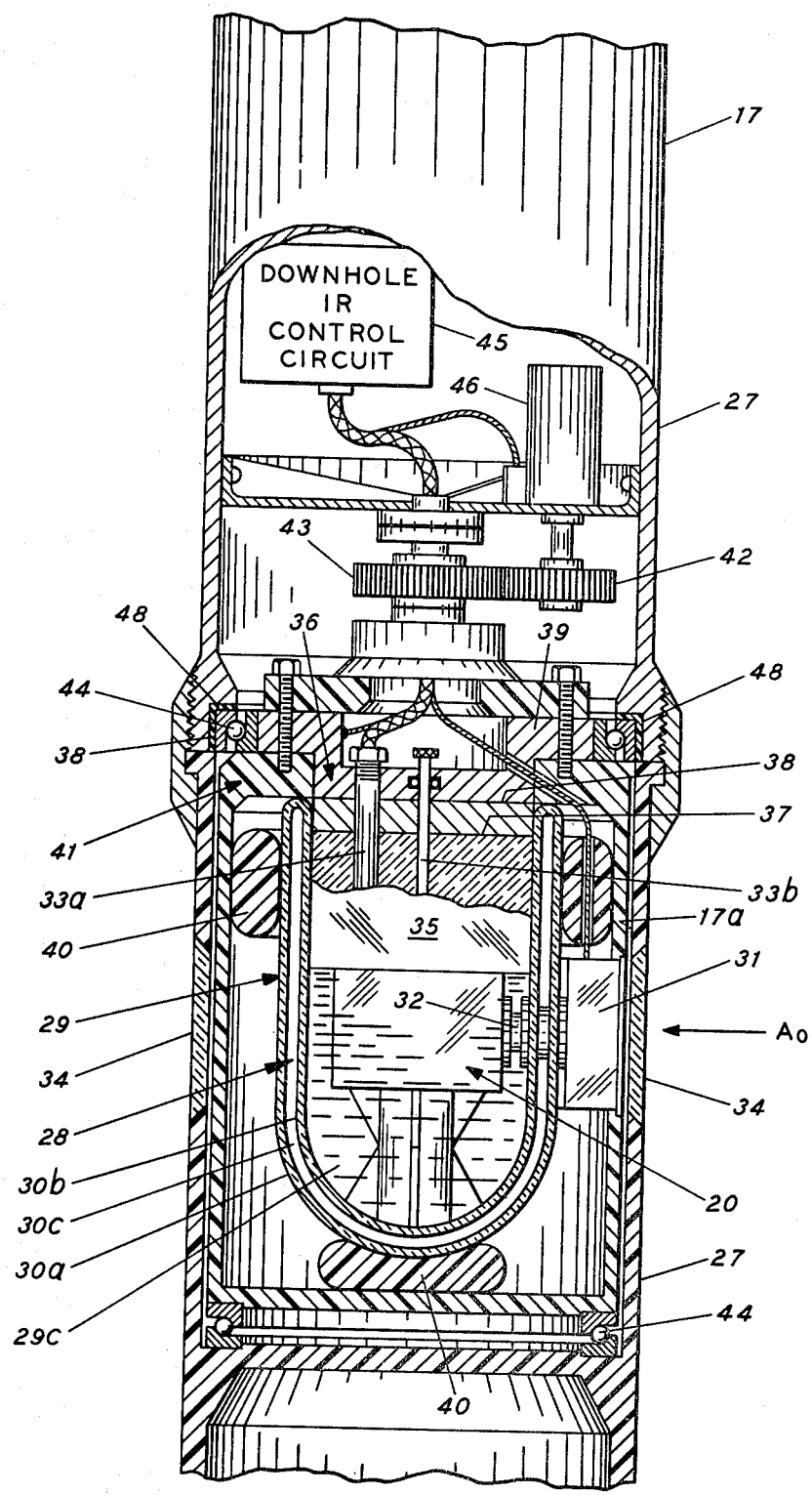
FIG. 2 is a partial sectional view of the logging sonde of FIG. 1 illustrating a cryostat for the Josephson detector of FIG. 1 in more detail, as well as control circuitry for reorienting the Josephson detector circuit and cryostat of FIG. 2 in azimuth while positioned down-hole adjacent an earth formation.

FIG. 2 illustrates circuitry associated with the utilization of the Josephson detector of FIGS. 3 and 4 circuit for performing the method of the present invention. In FIG. 2, the Josephson detector circuit 20 is seen to be suspended within a pressurized, fluid-type housing 27 of the logging sonde 17. As previously mentioned, as the logging sonde 17 is drawn through the borehole, a group of insulated conductors transfer energy and signals to and from the depictor circuit 20 to control and display unit 25 (FIG. 1) at the earth's surface in order to identify properties of the earth's formation adjacent to the borehole. Because of the earth's temperature, many boreholes traversing an earth formation have ambient temperatures in excess of 200° C. In order to provide superconducting properties, in the aforementioned temperature ranges, i.e., from 0.5° K to 25° K, with 1° K to 16° K being preferred, a cyrogenic bath 28 is encased about the Josephson detector elements.

Bath 28 comprises a Dewar flask 29 which has an outer wall 30a and an inner wall 30b of silvered glass or the like. The outer and inner walls 30a and 30b are separated by an evacuated annulus 30c. Silvering of these walls 30a and 30b tends to protect the interior of the flask from radiant heat transfer. The vacuum between the walls retards heat conduction from the borehole into the interior of the flask.

Dewar flask 29 also indicates a bore through which extends a light pipe 32 which terminates adjacent to interior wall 17a of the housing 27 of the logging sonde 17 in a direction from which radiation is to be detected. Light pipe 32 transmits infrared radiation only, in the direction of arrow $A_o$. Housing 31 surrounds the detection end of pipe 32 and is seen to terminate adjacent to annular sapphire window 34. Annular support and shock-absorbing pads 40 can be interposed between the outer wall 30a of the Dewar flask 29 and the inner surface of the logging header 41. In the region of the annular sapphire window 34, the housing 27 of the sonde is thus provided with a construction which does not inhibit infrared transfer from the exterior of the formation to the Josephson detector circuit 20. The pads 40 protect the delicate flask 29 from damage during handling and operation of the logging sonde within the borehole. The interior of the Dewar flask 29 contains a low-temperature coolant 29c such as liquefied helium (boiling point 4.2° K) in order to provide for superconducting characteristics within the Josephson detector circuit 20.

A plug 35 (which may be a sapphire rod to provide limited thermal conduction from the interior of the Dewar flask 29 and to provide satisfactory electrical insulation for conductors of the Josephson circuit elements) is lodged snugly in the open neck of the flask 29. It can include a pair of vertical bores appropriately fitted with rods 33a and 33b. Rod 33a forms a fluid-tight seal at its exterior, but also has a central bore for passage of electrical conductors therethrough. Rod 33b can be rotated, i.e., mechanically adjusted, to change mode response of the Josephson circuit, as explained below. The elements of the Josephson detector circuit 20 generate a limited amount of heat; also, the flask 29 may fail to provide perfect thermal insulation of these from the borehole. Therefore, an additional thermoelectric cooling module generally indicated at 36 may be desirable in order to maintain the detector at superconducting temperatures.

Module 36 usually indicates means to absorb heat from a cold junction 37 formed at the interface between the module 36 and sapphire plug 35. The heat flow from the flask interior towards the plug 35 is pumped by the module 36 to a warmer junction 38 so that heat can be dissipated ultimately in the borehole environment. It should be noted that module 36 is well known in the art. One such module comprises an array of bismuth telluride devices; e.g., they respond to an appropriate applied current by drawing heat from a body at low temperature and discharging this heat to another body at a high temperature.

Thin film 48 (say of electrically insulating and thermally conducting material such as aluminum oxide) can be used to electrically insulate the hot junction 38 from thermally conducting material comprising the upper housing 27 of the logging sonde. In the upper region of the logging sonde, the housing material is metal, so that heat can be easily dissipated via circumscribing ring 39 and bearings 44 to the borehole environment. In the region of the Josephson detecting circuit 20, however, the side wall of the housing is of an acceptable IR transferring material. Heat flows from the module 36 through ring 39 and thence through thin film 48 and the logging sonde into the borehole. For purposes of this application; the Dewar flask 29, coolant 29c, plug 35, and the thermoelectric cooling module 36 are considered to comprise a cryostat, the cryostat maintaining the Josephson circuit 20 at a constant superconducting low temperature within the flask interior.

FIG. 2 also illustrates suitable mechanisms for reorienting the Josephson detector circuit 20 of the present invention in azimuth at each mapping depth. As shown, the azimuthal reorienting header 41 rotatably connects to logging sonde housing 27 through bearings 44. Reorientation of the detector as a function of azimuth is initiated by signals passing from up-hole controls 23 (FIG. 1) through down-hole control circuitry 45 to rotor 46. Gears 42 and 43 are thus energized and cause rotation of the sonde header 40 including circuit 20 about an axis along the wellbore. Rotor 46 also includes a sensor which indicates the relative and/or absolute azimuth travel of the header 41, as reorientation occurs.

It is known that the infrared energy from the oil reservoir has a greater probability of being detected when the detector is perpendicular to the point of origin. Accordingly, the Josephson detecting circuitry 20 provided with azimuthal reorientation can be said to achieve more reliable results.

Figure 5:
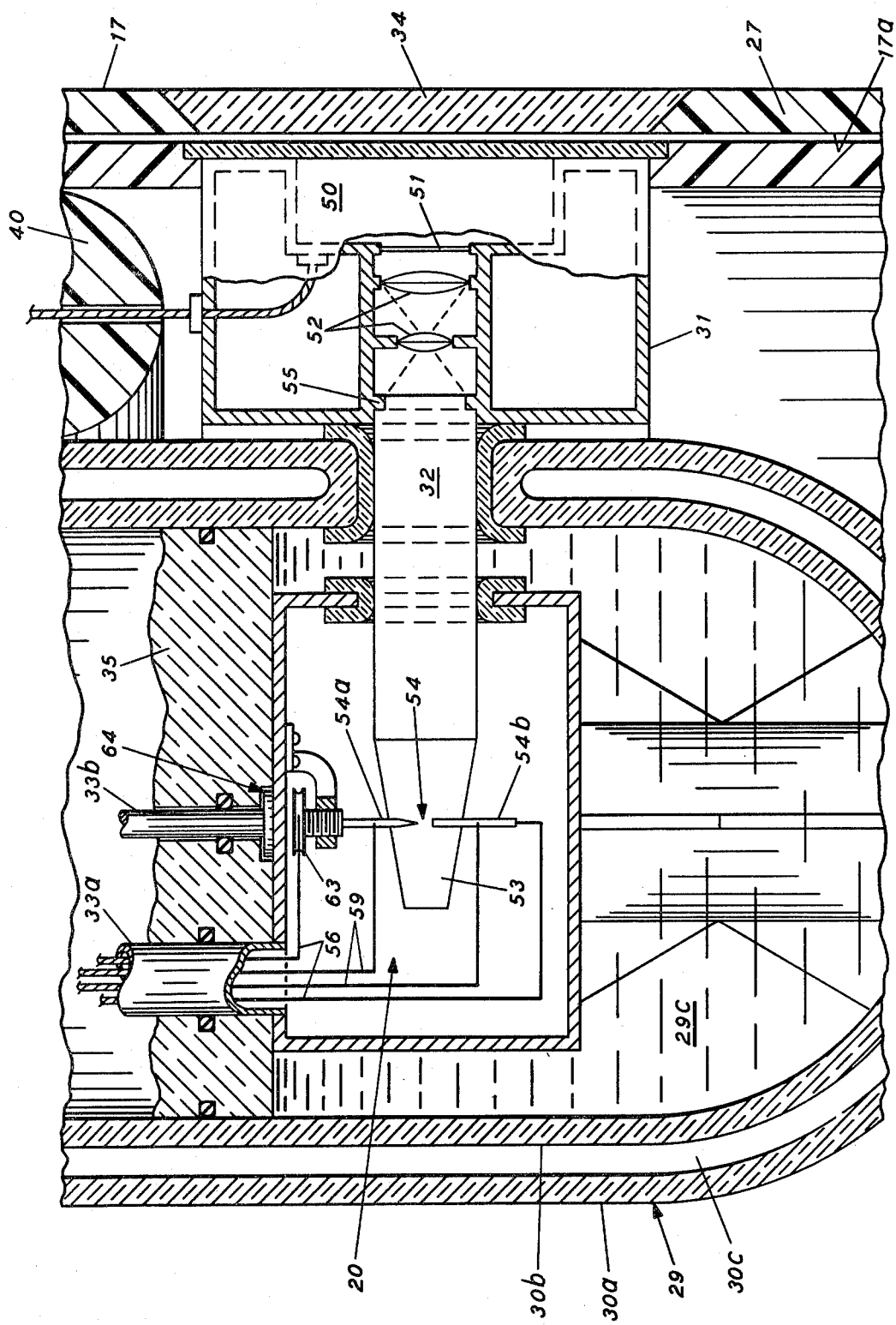
FIG. 5 is a partial section of the logging sonde of FIG. 2 illustrating the Josephson detector circuit in still more detail.
Figure 6:
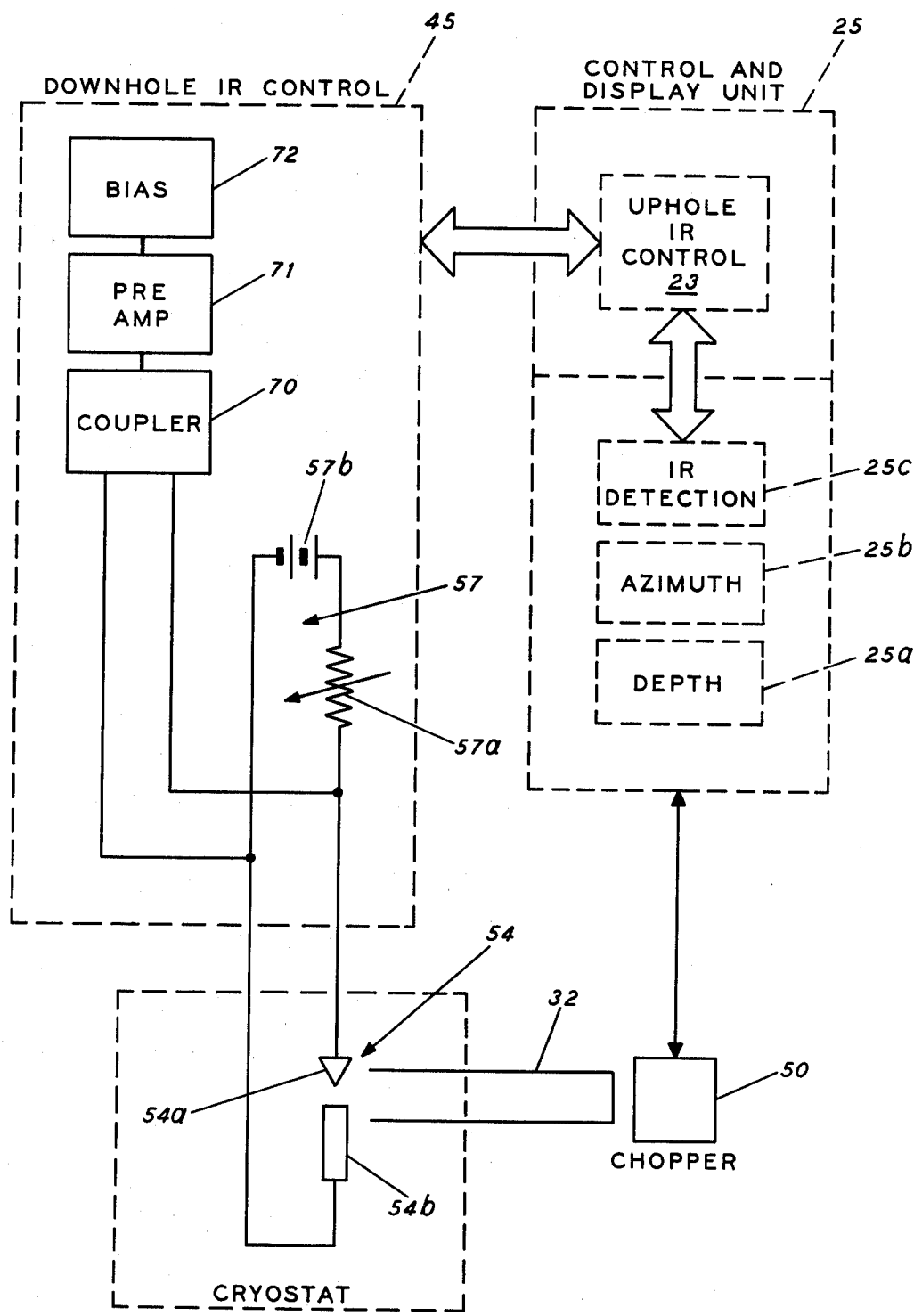
FIG. 6 is a schematic diagram of circuitry useful in the operation of the Josephson detector of FIG. 2 during formation logging operations.

FIGS. 5 and 6 illustrate Josephson detector circuit 20 in still more detail. It should be noted that only certain elements of circuit 20 must be placed within the Dewar flask 29; other elements have been relocated to more convenient positions within the upper section of the sonde, since these relocated elements do not require a low-temperature environment.

With particular reference to FIG. 5, after radiation has entered through sapphire window 34 in logging sonde 17, the Josephson circuit 20 first chops the energy at a selected modulation frequency, say about 90 Hz, using a chopper schematically illustrated at 50. Chopper 50 is of conventional design, utilizing a mechanical rotor connected to a source of rotation, the rotor being positioned in alignment with the longitudinal axis of light pipe 32. The energy then passes through a filter 51 and is then focused by lens 52 onto light pipe 32. Usage of lens 52 and pipe 32 increases sensitivity of the system to radiation having frequency components in the correct range, i.e., in a range of 8400 to 9600 gigahertz. The radiation passes down the pipe 32 to its terminal end where a frustoconical receiving section 53 is formed. Section 53 adjusts the radiation to a correct diameter for passage into Josephson junction 54 forming an IR-sensing area. Heat rays emitted by the walls of the pipe 32 are captured by an aperture stop 55 of the housing 31. The purpose of stop 55: to increase resolution of the system by decreasing lateral diffusion of the focused IR radiation as well as blocking heat rays generated upstream from the stop (along housing 31).

Josephson junction 54 is mounted transverse to the longitudinal axis of symmetry of pipe 32 and includes at least superconductors 54a and 54b. Two pairs of conductors are attached to the junction 54: one pair 56 provides bias for the Josephson junction, and the other pair 59 permits measurements of junction signals so as to indicate the IR characteristic at the junction, as explained below. To prevent minimum pick-up and minimize harmful effect of electrical transients, the conductor pairs 56 and 59 are twisted as shielded whenever possible both inside and outside the cryostat. In this way, speed of response to rapidly varying components of IR radiation is assured.

Referring now to FIG. 6, the response mode of the junction 54 is first set using a variable DC bias means 57 including potentiometers 57a and variable source 57b under control of up-hole and down-hole central circuits 23 and 45, respectively. After the response mode has been established and the logging sonde positioned at a selected depth within the borehole, the up-hole and down-hole control circuits 23 and 45 are activated to initiate operation. E.g., the azimuthal direction is selected and the control circuits 23 and 45 activated to rotate the circuit 20 into the correct azimuthal direction. Next, the logging sonde is positioned against the side wall of the borehole as seen in FIG. 1. This focuses the Josephson circuit 20 in a selected azimuthal direction at a known depth. Junction signals are next generated at junction 54, indicative of the passing of IR energy. These signals in turn are coupled through complex 70 to amplifier 71 biased by source 72 within downhole control circuit 45 and then sent uphole to control and display 25 at the earth's surface (see FIG. 1). Control and display unit 25 includes an amplifier/rectifier (not shown) as well as display indicators 25a, 25b and 25c, as previously explained.

The Josephson circuit 20 is frequency optimized in several modes in the following manner to detect IR radiation from adjacent in-situ petroleum materials.

ZERO-VOLTAGE ZERO-CURRENT MODE

If the I-V characteristics of the Josephson point-contact junction is as depicted in FIG. 4, then assume the contact pressure has been correctly applied when the sonde of FIG. 6 was at the earth's surface, say by operation of a differential screw arm 63 rotatable by means of magnetic coupler 64 (FIG. 5) to provide for detection of IR radiation at a fundamental frequency (f). Assume also that appropriate level of DC bias has been introduced across the Josephson junction by correct "tuning" of bias means 57 (FIG. 6), including potentiometer 57a. (Although the bias means 57 and the potentiometer 57a of FIG. 6 are seen to be located down-hole within the sonde within control circuit 45, it should be apparent that they could both be located up-hole if desired). The chopper 50 is energized through control circuits 23 and 45. IR radiation is detected at the junction 54 by monitoring the maximum amount of zero-voltage current which flows through the junction 54 at the given bias voltage, as can be seen clearly with reference to FIG. 4a.

Figure 4A:
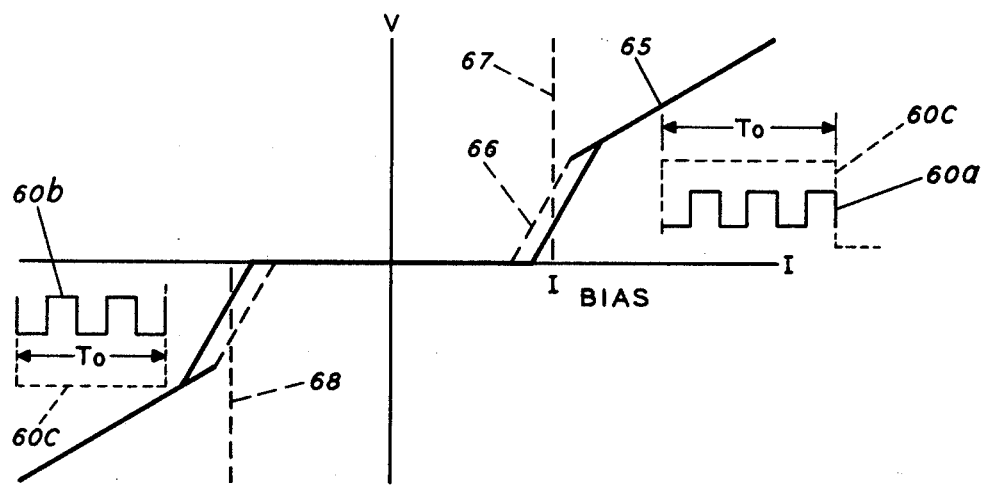

Referring now to FIG. 4a, when the IR radiation impinges on the Josephson junction, the radiation diminishes the amount of zero-voltage current that flow through the junction. A voltage characteristic (depicted at 60a of FIG. 4a) is developed at the chopper frequency related to the change in zero-voltage current developed across the junction. For example, FIG. 4a shows how the solid curve 65 represents the I-V Josephson characteristic at the Josephson junction in the absence of radiation, while the phantom line 66 represents the I-V characteristic in the presence of radiation. Thus a DC bias through the junction (say via bias means 57 and potentiometer 57a of FIG. 6) can be held at a point of high differential resistance without effect system parameters. Change in zero-voltage current (along phantom line 67) appears as voltage signal 60a modulated at the operating frequency of the chopper. After the signal voltage is suitably amplified and rectified, say by control and display unit 25 (FIG. 1), the resulting data are displayed in the manner previously explained.

ZERO-VOLTAGE-MODE/DC-BIAS-VARIATION AT A SELECTED REPETITION RATE

In this system, the polarity of the DC bias current of the Josephson junction as depicted in FIG. 4a is changed (via bias means 57 including potentiometer 57a and variable DC source 57b within control circuit 45 of FIG. 6) to vary periodically between two (not one) points of differential resistance. Thus, the change in zero-voltage current is along first phantom line 67 of FIG. 4a, than along a second phantom line 68. The change in zero-voltage current (along phantom lines 67 and 68) appears first as voltage signal 60a modulated at the operating frequency of the chopper, and then as voltage signal 60b. To carry out this aspect of the present invention, control circuits 23 and 45 are appropriately energized to change the biasing signal 60c of bias means 57 at a constant repetition rate to define energization time $T_o$.

The importance of varying the external bias at the selected repetition rate (to generate DC voltage bias signal 60c) is, principally, for distinguishing signals of formation petroleum materials such as hydrocarbonaceous materials (i.e., crude oil) from other elements and/or materials, as can best be seen by referring to FIG. 1. As previously mentioned, sedimentary bed 13 can be an oil-bearing formation, such as limestone, laid down horizontally between more impervious sedimentary beds 14 and 15. Since the lithological distribution of beds 13, 14 and 15 is of great importance in developing a complete geologic picture of the subsurface, there may be a need to distinguish certain physical rock parameters. Rock parameters which might be useful in such identification include: absorption, porosity, fluid content, formation pressure. In this regard, merely monitoring changes in response at the Josephson junction, as noted above, it has been found that the IR characteristics from certain in-situ fluids, such as formation water and formation oil, can be distinguished and the results related to rock parameters of interest. Such results flow, in large part, from the symmetrical nature of the zero-voltage Josephson characteristic depicted in FIG. 4a which provides for the generation of a family of data at each logging station. In this regard, the Josephson junction easily responds to amplitude changes with a sensitivity factor previously noted, since it has a response time of less than 10 nanoseconds. Moreover, such results can also be utilized to indicate the lateral extent of the invaded zone surrounding the borehole by distinguishing the character of the filtrate of the drilling fluid from other formation constituents, if desired.

For the most part, the point-contact Josephson junction may be preferred in the present invention, since its low-junction capacitance permits better coupling at the higher frequencies.

FINITE-CURRENT MODE

In this mode, the value of circuit resistance is varied until a finite current level (at zero-voltage) is established across the Josephson junction again using control circuits 23 and 45 (FIGS. 1 and 2) in the manner previously explained. In this mode, the I-V characteristics are represented by the solid curves 47a and 47b set forth in FIG. 3. The circuit resistance (or bias value) is then varied to produce an I-V condition just below threshold, i.e., the Josephson junction is biased so that a current just below the critical supercurrent of FIG. 3 is caused to flow. Then, application of an external electric or magnetic field results in the reduction of that critical supercurrent so that the I-V characteristics as set forth along the solid curve 47b of FIG. 3 are generated. The resulting finite voltage is measured across the junction, the value of which is proportional to frequency of the impinging IR energy, as previously explained.

The present invention can be most advantageously utilized for detection of electromgnetic radiation in the frequency range generally associated with RF Josephson effect in the aforementioned range of 8400 to 9600 gigahertz. However, if the device is operated as a detector above the tunneling threshold in the manner described by Dayem and Martin (reference supra), the current is set at a value slightly in excess of the maximum obtained on the straight-line portion of the characteristic occurring at the total gap energy position. Application of an RF field within the appropriate frequency range results in the characteristic shown for the curve portion labeled 47b in FIG. 3.

Although certain embodiments of the present invention have been illustrated and described, the invention is not meant to be limited to those embodiments, but rather to the scope of the following claims.

What is claimed is:

1. Apparatus for indicating the presence of hydrocarbons in an earth formation traversed by a wellbore by passively detecting infrared radiation therefrom due principally to stretching vibration having frequency components in a range of 8400 to 9600 gigahertz, comprising:

a tool housing for traversing said wellbore;

a Josephson-type detector tuned to operate with maximum response in a frequency range of about 8400 to 9600 gigahertz, comprising at least two superconducting bodies positioned within said tool housing defining a current path through a sensing area therebetween;

means for selectively biasing said Josephson-type detector resulting in a Josephson-type current flow;

means connected to said Josephson-type detector for monitoring a change in the Josephson zero-voltage current characteristic of said Josephson-type detector due to the incidence of said infrared radiation from said hydrocarbons falling into said sensing area whereby an electrical signal is produced;

means for indicating said electrical signal as a function of at least depth of said apparatus within said wellbore.

2. Apparatus of claim 1 in which said control and monitoring means includes means for mechanically varying pressure between said superconducting bodies of said Josephson-type detector so as to aid in tuning response characteristics thereof within a frequency range of about 8400 to 9600 gigahertz.

3. Apparatus of claim 1 in which said control and monitoring means includes means for mechanically varying pressure between said superconducting bodies of said Josephson-type detector so as to aid in tuning response characteristics thereof within a frequency range of about 8400 to 9000 gigahertz.

4. Apparatus in accordance with claim 1 in which said biasing means includes associated means for controlling response of said Josephson-type detector whereby characteristics are modified only when exposed to infrared radiation at a frequency ($f$) within a range of 8400 to 9600 gigahertz satisfying the equation $f = 2eV/nh$ where V is the biasing voltage, $e$ is the magnitude of the electronic charge, $h$ is Planck's constant, and $n$ is any integer other than zero.

5. Apparatus in accordance with claim 1 in which said biasing means includes associative means for controlling response of said Josephson-type detector whereby current characteristics are modified only when exposed to infrared radiation at a frquency ($f$) within a range of about 8400 to 9000 gigahertz satisfying the equation $f = 2eV/nh$ where V is the biasing voltage, $e$ is the magnitude of the electronic charge, $h$ is Planck's constant, and $n$ is any integer other than zero.

6. In a tool for logging an earth formation penetrated by a wellbore and including a housing, means for controllably traversing said housing through said wellbore, the improvement comprising:

(a) a Josephson-type detector means positioned within said housing, tuned to operate in a frequency range of about 8,400 to 9,600 gigahertz and comprising at least two superconducting bodies positioned so as to define a current path through a sensing area therebetween;

(b) control and monitoring means connected to said Josephson-type detector for tuning said detector to respond to infrared radiation emanating principally from hydrocarbons in a stretching vibratory mode of at least 8400 gigahertz adjacent to said wellbore, and from said radiation response indicating their presence in said formation as a function of depth.

7. The improvement of claim 6 in which said Josephson-type detector means is tuned to respond only to infrared radiation in a frequency range of from about 8400 to 9600 gigahertz.

8. The improvement of claim 6 in which said Josephson-type infrared radiation detector means is tuned to respond only to infrared radiation in a frequency range of from about 8400 to 9000 gigahertz.

9. The improvement of claim 6 in which absence of infrared radiation from a region adjacent to said oil reserve is indicating a gas reserve in said earth formation.

10. The improvement of claim 6 in which said control and monitoring means is further characterized by cooperative control means for rotating at least said Josephson-type detector means through a series of azimuthal angles relative to said wellbore, whereby said earth formation can be logged as to sources of infrared condition as a function of azimuthal angle as well as depth.

11. A method of detecting the presence of hydrocarbons in an earth formation traversed by a wellbore which comprises:

(a) positioning in said wellbore a Josephson-type detector at a known mapping depth, said detector including at least two superconducting bodies defining a current path through a sensing area therebetween, means for biasing said detector to a voltage level to provide Josephson-type zero-voltage current characteristics capable of modification in response to external infrared radiation emanating from said formation hydrocarbons due principally to stretching vibration of C-H bonds thereof in a range of 8400 to 9600 gigahertz.

(b) monitoring changes in said Josephson-type detector so as to produce an electric signal in accordance with the presence of said infrared radiation emanating from said hydrocarbons in said frequency response range of about 8400 to 9600 gigahertz;

(c) recording said electrical signal as a function of mapping depth.

12. Method in accordance with claim 11 in which step (a) is further characterized by mechanically varying pressure between said superconducting bodies of said Josephson-type detector so as to aid in having response characteristics thereof within a frequency range of about 8400 to 9600 gigahertz.

13. Method in accordance with claim 11 in which step (a) is further characterized by mechanically varying pressure between said superconducting bodies of said detector so as to aid in having response characteristics thereof within a frequency range of about 8400 to 9000 gigahertz.

14. Method in accordance with claim 11 in which step (b) is further characterized by controlling the bias of said detector whereby current characteristics are modified only when exposed to infrared radiation in a frequency range of about 8400 to 9600 gigahertz.

15. Method in accordance with claim 11 in which step (b) is further characterized by controlling the bias of said detector whereby current characteristics are modified only when exposed to infrared radiation in a frequency range of about 8400 to 900. gigahertz.

16. Method in accordance with claim 11 further characterized by repeating steps (a), (b) and (c), in sequence, at a plurality of mapping depths along said well bore so as to map the entire vertical extent of said earth formation for the presence of said formation fluids.

17. Method in accordance with claim 11 in which step (a) is further characterized by said scanning area of said Josephson-type detector being confined to a selected azimuthal path; and said path position being rotated, in sequence, in azimuth at each mapping depth so as to accurately determine the location of formation components from which said infrared radiation emanates as a function of azimuth at each mapping agent.

18. Method in accordance with claim 11 in which absence of infrared radiation from a region adjacent to said oil reserves is indication of a gas reserve in said earth formation.

19. Method in accordance with claim 11 in which step (b) is proceeded by the step of focusing said infrared radiation, including rotation in azimuth, so as to cause said radiation to fall upon said sensing area of said Josephson-type detector in increased abundance.

20. In a tool for logging an earth formation penetrated by a well bore and including a housing, and means for controllably traversing said housing through said well bore, the improvement comprising:
  (a) a Josephson-type detector means positioned within said housing, operating at a frequency in the range from about 100 to 10,000 gigahertz and comprising at least two superconducting bodies positioned so as to define a current path through a sensing area therebetween;
  (b) control and monitoring means connected to said Josephson-type detector means for tuning said detector to respond to a selected frequency range of infrared radiation emanating from formation elements adjacent to said well bore in said range of from about 100 to 10,000 gigahertz, and from said radiation response, indicating the presence of hydrocarbonaceous materials in said formation as a function of depth, said control and monitoring means including means for mechanically varying pressure between said superconducting bodies of said Josephson-type detector means at a selected mapping depth within said well bore so as to change the response characteristics of said Josephson-type detector means without necessitating removal of said housing to the earth's surface.

21. Improvement of claim 20 in which said infrared radiation emanates from an oil reserve adjacent to said well bore and is in a frequency range of from about 2,000 to 5,000 gigahertz.

22. Improvement of claim 20 in which said control and monitoring means is further characterized by cooperative control means for rotating at least said Josephson-type detector means through a series of azimuthal angles relative to said well bore, whereby said earth formation can be logged as to sources of infrared radiation as a function of azimuthal angle as well as depth.

23. A method of detecting the presence of formation components adjacent to an earth formation traversed by a well bore which comprises:
  (a) positioning in said well bore a Josephson-type detector at a known mapping depth, said detector including at least two superconducting bodies defining a current path through a sensing area therebetween, means for biasing said detector to a voltage level to provide Josephson-type zero voltage current characteristics capable of modification in response to external infrared radiation emanating from said formation components adjacent to said well bore;
  (b) monitoring changes in said Josephson-type zero-voltage current characteristics so to produce an electric signal in accordance with frequency components of incident infrared radiation emanating from said formation in range from about 100 to 10,000 gigahertz;
  (c) recording said electrical signal as a function of mapping depth;
  (d) mechanically varying pressure between said superconducting bodies of said Josephson-type detector at a selected mapping depth within said well bore so as to change the response characteristics of said Josephson-type detector without necessitating removal to the earth's surface.

* * * * *